United States Patent [19]

Harrington

[11] Patent Number: 4,903,048

[45] Date of Patent: Feb. 20, 1990

[54] SIMULATED COLOR IMAGING USING ONLY TWO DIFFERENT COLORANTS/TONERS

[75] Inventor: Steven J. Harrington, Holley, N.Y.

[73] Assignee: Xerox Corporation, Stamford, Conn.

[21] Appl. No.: 276,593

[22] Filed: Nov. 28, 1988

[51] Int. Cl.⁴ ............................................. G01D 15/00
[52] U.S. Cl. ..................................... 346/157; 358/298
[58] Field of Search ..................... 346/150, 153.1, 157; 364/518, 519; 358/298, 296

[56] References Cited

U.S. PATENT DOCUMENTS

| | | | |
|---|---|---|---|
| 4,078,929 | 3/1978 | Gundlach | 96/1.2 |
| 4,554,241 | 11/1985 | Edwards | 430/301 |
| 4,809,063 | 2/1983 | Moriguchi et al. | 358/298 |

*Primary Examiner*—Arthur G. Evans

[57] ABSTRACT

Simulated color imaging using gray level patterns produced from two differently colored materials by employing fine patterns of dots. The dots blend with the background and yield a gray or colored appearance when seen from a distance. The imaging process utilizes ink pattern designs in conjunction with registered two-color imaging to thereby form simulated color images. Digital information representing two sets of gray-level producing patterns, set A for color A and set B for color B, is electronically stored in computer memory. The patterns in set B are complementary to those of set A. An apparent or simulated color image is produced by overlaying, combining or juxtapositioning a pattern from set A with a complementary pattern from set B, the combined image being subsequently rendered visible using two different colorants. A gray level pattern is produced for each elemental area of an original image.

9 Claims, 3 Drawing Sheets

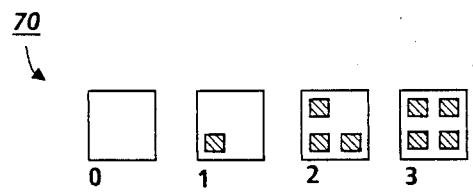
FIG. 3
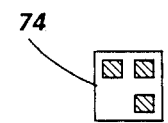
FIG. 3a
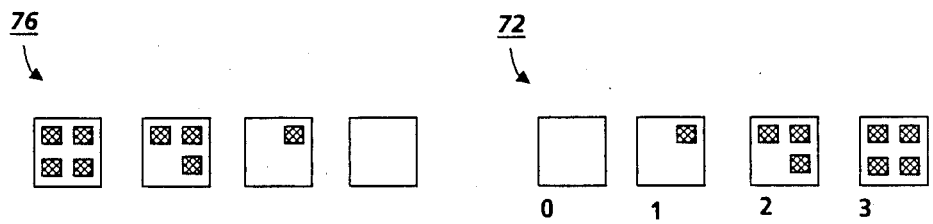
FIG. 3b           FIG. 3c
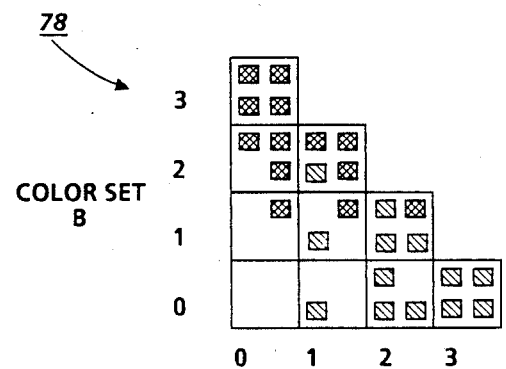
FIG. 3d

SIMULATED COLOR IMAGING USING ONLY TWO DIFFERENT COLORANTS/TONERS

BACKGROUND OF THE INVENTION

This invention relates generally to the formation of simulated color images and more particularly to the use of only two colorants such as different colors or shades of toner materials which are applied in juxtaposition. The images may be formed by electrostatic means on a charge retentive imaging surface in a single pass of the surface through the process stations employed.

In the practice of conventional xerography, it is the general procedure to form electrostatic latent images on a xerographic surface by first uniformly charging a charge retentive surface such as a photoreceptor. Only the imaging area of the photoreceptor is uniformly charged. The image area does not extend across the entire width of the photoreceptor. Accordingly, the edges of the photoreceptor are not charged. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

In tri-level, highlight color imaging, unlike conventional xerography, the image area contains three voltage levels which correspond to two image areas and to a background voltage area. One of the image areas corresponds to non-discharged (i.e. charged) areas of the photoreceptor while the other image areas correspond to discharged areas of the photoreceptor The concept of tri-level, highlight color xerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In highlight color xerography as taught by Gundlach, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged-area development, i.e. CAD) stays at the full photoreceptor potential ($V_{cad}$ or $V_{ddp}$, shown in FIG. 1(a). The other image is exposed to discharge the photoreceptor to its residual potential, i.e. $V_{dad}$ or $V_c$ (typically 100 v) which corresponds to discharged area images that are subsequently developed by discharged area development (DAD) and the background areas exposed such as to reduce the photoreceptor potential to halfway between the $V_{cad}$ and $V_{dad}$ potentials, (typically 500 v) and is referred to as $V_{white}$ or $V_w$. The CAD developer is typically biased about 100 v ($V_{bb}$, shown in FIG. 1(b) closer to $V_{cad}$ than $V_{white}$ (about 600 v), and the DAD developer system is biased about 100 v ($V_{cb}$, shown in FIG. 1(b) closer to $V_{dad}$ than $V_{white}$ (about 400 v).

Currently, a process known as the four-color separation process is very widely used in the printed reproduction of colored pictures, transparencies and the like. The four-color separation process is generally responsible for all of the high-quality colored reproductions in magazines and books, and is also used for some newspaper work as well.

In the most common version of this process, the original print or transparency is photographed through different filters to produce different individual films which correspond to the basic colors of the four-color separation process: yellow, magenta, cyan and black. The filters utilized to extract the first three of these colors from the original have tints which are the complementary colors of the colors being drawn out. Thus, a green filter is used to pick out the magenta, a blue filter is used to pick out the yellow, and a red filter is used to pick out the cyan. A combination of all filters is ideally utilized to pick out the black, although in some processes the black film is made by photographing the original in black-and-white film, without any filter.

Some "fine tuning" or adjustment of the intensities of the various colors in the process is made by selecting exposure times and development times. Also, in some instances the final inks used to print the final reproduction can be varied and selected to attain certain effects.

From the four pieces of film produced through this process, printing plates are made, these being subsequently attached to plate cylinders in a typical printing machine, which is then able to print the reproduction using the process colors; yellow, magenta, cyan and black.

Generally speaking, the printing industry is of the view that proper reproduction of any photograph or the like requires a four-color separation process of the kind just described, utilizing the process ink colors.

However, in certain branches of the printing industry, particularly in newspapers, shopping bags, the Yellow Pages and advertising flyers, the full four-color separation process represents a considerable expense, since it requires the material to be passed through four printing stations, in order to receive the four colors. This in turn requires the production of four plates, and the time required to mount them, adjust the components, etc. All of this represents a substantial cost factor which, for obvious reasons, it would be of advantage to reduce.

There is a two-ink process forming part of the prior art, known as duotone. In one version of this process, often called "Fake" duotone, a black and white original (for example a photograph) is first photographed on "Ortho" film through a contact screen to give a screen film. "Ortho" film is a high contrast film which is not sensitive to the red region of the spectrum. Then, the same screen is rotated through an angle of 30 degrees and another screen film is taken, substantially identical to the first, also on "Ortho" film. The two films are developed to different densities, then are used to make plates which are run in two colors, for example, red and black.

In another version of duotone, often called "Real" duotone, the original art is already in two colors, for example, red and black. The first step is to shoot "Ortho" film through a grey contact screen without any filter. Both the red and the black will be seen by the film, and the result will be a film in which the red and black are both picked up as black. Then, a panchromatic film is exposed through a red filter and a grey contact screen. In this arrangement, the film sees only black. The two films are then used to make plates which print red and black, respectively.

It is also known, particularly in the food advertising area where blue colors are rare, to do a three-color separation using the standard filters to obtain yellow, magenta and cyan, and then to print the image using yellow ink, red ink and black ink. In other words, the plate made from the cyan film prints in black ink.

It is further known to mix various colors to produce various other colors. For example, it is known to print a dot matrix of black superimposed on a dot matrix of yellow in order to produce various shades of green. It is also known that red and yellow will combine in the same way to produce orange. It is further known that yellow and cyan will combine to produce various shades of green.

Disclosed in U.S. Pat. No. 4,554,241 granted to Wallace Edwards on Nov. 19, 1985 is a process for creating strikingly realistic reproductions of an original utilizing only two printing plates inked with only two different colors. However, the process of making these plates does not involve simply one of the known parts of the standard four-color separation, nor does it utilize process inks.

By way of explaining this, it should be understood that, if a four-color separation were made to produce four plates intended to print yellow, magenta, cyan and black, and then if only the yellow and red were printed, or only the yellow, blue and black, or any other combination which was not the full combination of four colors, the resulting print would be clearly and definitely unbalanced, and anyone viewing the print would immediately see the unbalanced nature of the colors. The print would appear "too reddish" or "too far into the blue region", or blotchy. The aim of the process described in the '241 patent is to remove the unbalanced nature of a printed reproduction made with only two impressions, and thus two inks.

Simply stated, the process disclosed in the '241 patent consists in making a red printer by utilizing sequentially a green filter and a blue filter, and making a printer for another color such as green, blue or black by utilizing sequentially a red filter and a blue filter. More particularly, device described therein provides a method of printing on a sheet member a realistic reproduction of a colored original, utilizing a minimum of two different superimposed impressions, each with a different coloring medium, comprising:

(a) providing a colored original, (b) creating a first printing plate intended to print a non-process red color, by
  (1) making a green filter exposure of the original on a first means for recording a first optical image,
  (2) making a blue filter exposure of the original on said first means, steps (1) and (2) being carried out sequentially in any order,
(c) creating a second printing plate intended to print a second color different from that printed by said first plate, by
  (3) making a red filter exposure of the original on a second means for recording a second optical image,
  (4) making a blue filter exposure of the original on said second means, steps (3) and (4) being carried out sequentially in any order, and steps (b) and (c) being carried out in any order,
(d) providing a sheet member to receive two superimposed impressions, and
(e) using said first and second printing plates to print said red color and said different color, respectively, as the said superimposed impressions on said sheet member.

The invention of the '241 patent as stated therein, is applicable to the copying industry where it is well understood that the copying process involves the establishment of a latent electrostatic image on a drum or plate constituting a photoconductive surface, following which a colored "toner" is applied to the image-containing portions of the photoconductive surface, the electrical attraction causing the toner to remain in certain areas and be removed from others, following which the photoconductive surface with the toner is applied against a sheet of paper which picks up the toner as an image. The essence of the '241 invention can be applied to the copying industry, by arranging to have the photoconductive surface exposed through not one but two filters for each of the printings. These filters ideally would be used sequentially to build up an electrostatic image which is a composite of the images which would normally be obtained through the two different colored filters. Then this composite electrostatic image is contacted by the appropriate colored toner, and the same is printed on the paper sheet.

BRIEF SUMMARY OF THE INVENTION

Briefly, the present invention utilizes ink pattern designs preferably in conjunction with tri-level electrostatic imaging to thereby form simulated color images. In tri-level imaging systems each pixel has three possible states: color A, color B or the color of the image substrate which is usually white paper but can be any preferred color. Since all pixels have only one color, apparent shades, hues, etc. are made by juxtapositioning of single colored pixels. Thus, apparent or simulated color is effected by mixing all three states within an ink pattern block.

In the preferred embodiment of the invention, two sets of ink patterns are electronically stored in computer memory: set A for color A and set B for color B. The ink patterns in set B are complementary to those of set A. An apparent or simulated color image is produced by overlaying an ink pattern from set A with an ink pattern from set B.

DESCRIPTION OF THE DRAWINGS

FIG. 3 is a graphical representation of a set of ink patterns;

FIG. 3a is a graphical representation of an ink pattern illustrating a restriction against the combining of ink patterns from two sets of ink patterns;

FIG. 3b is a graphical representation of a set of ink patterns that is complementary to the set shown in FIG. 3;

FIG. 3c is a graphical representation of the set of ink patterns illustrated in FIG. 3b but in the reverse order; and FIG. 3d is a graphical representation of ink combinations of ink patterns formed by overlaying a pattern from the set of ink patterns illustrated in FIG. 3 with a pattern from the set of patterns illustrated in FIG. 3b.

DETAILED DESCRIPTION OF THE PREFERRED EMBODIMENT OF THE INVENTION

Figure 1:
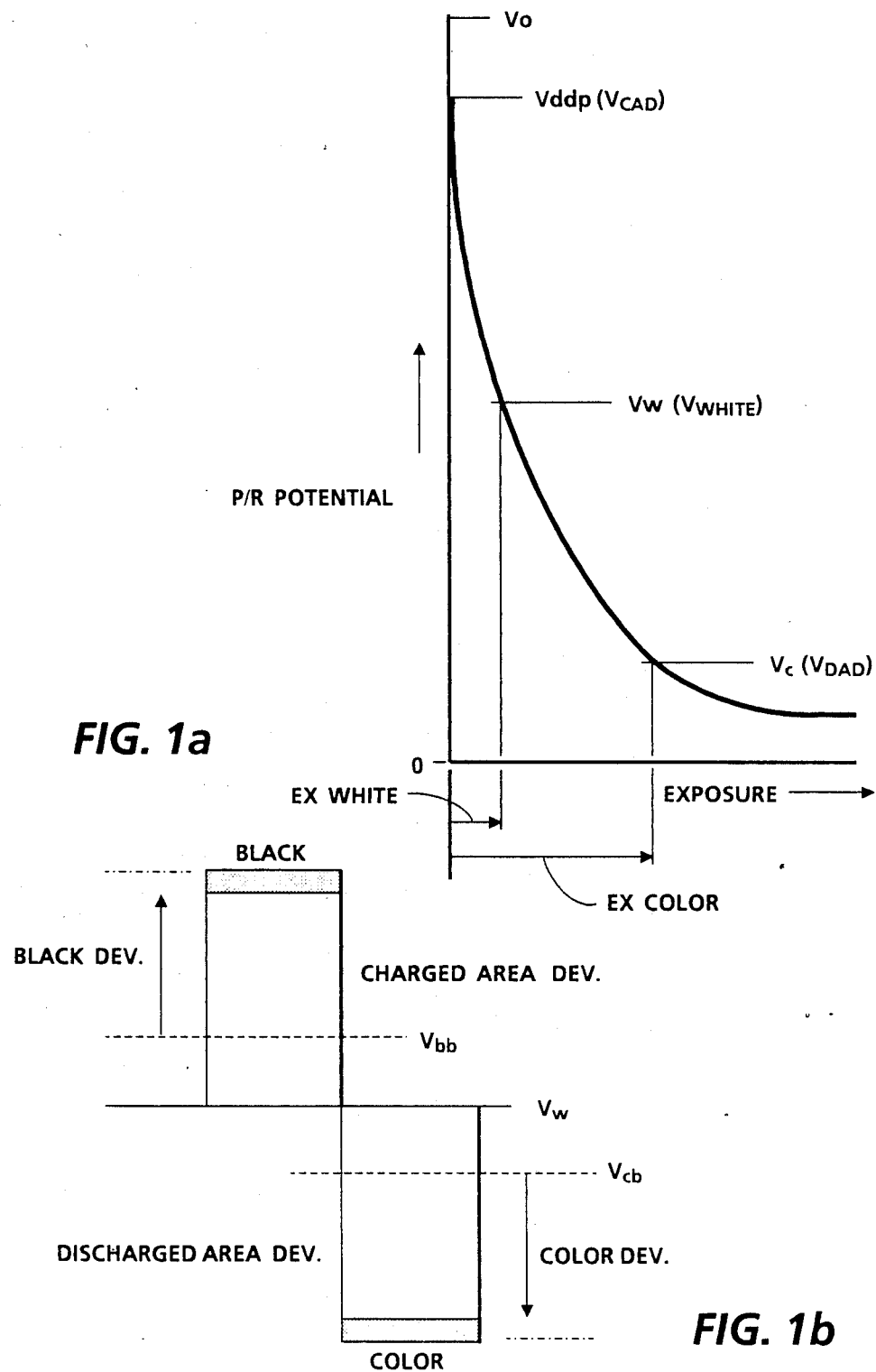
FIG. 1a is a plot of photoreceptor potential versus exposure illustrating a tri-level electrostatic latent image.
FIG. 1b is a plot of photoreceptor potential illustrating single-pass, highlight color latent image characteristics.

In electronic printing on a raster device, the imagable area of the substrate is subdivided into a fine pattern of dots called pixels. The pixel is the smallest area over which one can control the placement of the colorant. The marking device can color or not color each pixel. A computer is used to instruct the marking device as to which pixels to color in order to create the desired image. The pixels are scanned in a fixed order or raster. For each pixel the computer generates a binary value indicating color or no color. An electronic subsystem converts the binary values into the control signals for the marking device. On a black-and-white printer, intermediate shades of gray may be produced by printing a rapidly alternating pattern of black and white pixels. This pattern, when viewed from a distance, has the appearance of gray. Different patterns yield different shades of gray depending on the ratio of black to white pixels. The computer may store a set of patterns which can be used for producing gray shades. The patterns are often saved as a collection of binary values indicating the black/white coloring for a small rectangular area of the image surface. The pattern is then replicated as needed to cover the entire image surface. One might alternatively store in the computer an algorithm for generating the pattern, rather than the pattern itself. In this case the pattern must be synthesized whenever needed. Each pattern is referred to as an "ink" since it results in a different shade of gray. (This is not an actual colorant of toner, but only a pattern within the computer.)

For multi-color printers, the computer must provide a raster of pixel values for each of the colorants. Various shades, hues, and tints are produced by combinations of pixel patterns for the various colorants. The design of the patterns depends fundamentally on whether the marking technology preserves registration between colors. If the raster of pixels for one colorant can move relative to the raster of pixels for another colorant from one image to the next, then sometimes the pixels for different colors will overlap and sometimes they will not. To avoid moire effects and color shifts, the patterns are designed to distribute and smooth the overlap. This is usually done by a rotation of the relative axes of the patterns for the colorants.

In technologies where the registration between colors is precise, a different approach may be taken. In this case each pixel may be assigned a color. Tri-level electrophotography is just such a technology; in a single pass of the laser beam each pixel is set to either black, highlight color, or substrate color. For a device where registration is maintained one can create patterns (or "inks") in which each pixel is assigned one of the possible primary colors. This results in many more potential patterns than could be formed from strictly binary pixel values. For this approach one needs a scheme for generating the patterns, and if they are to actually be stored, one would like a representation which does not require the large amounts of memory which would be needed for explicit description of every pattern. This invention provides this for the case of two colorants.

Figure 2:
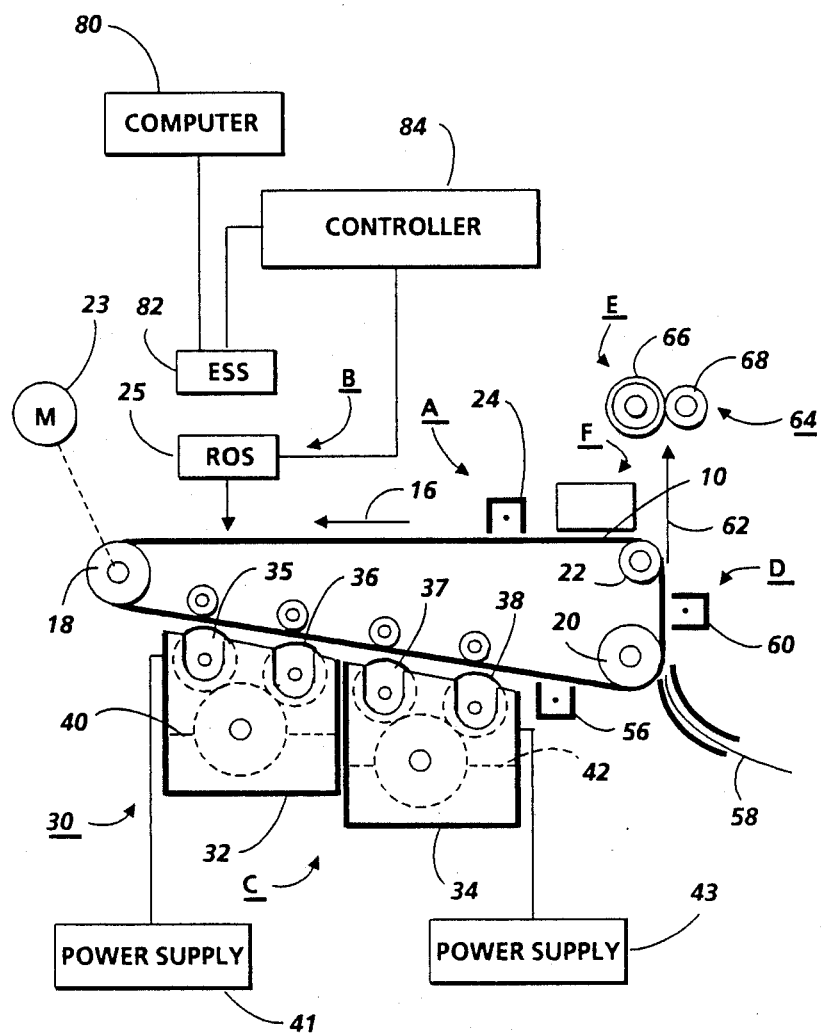
FIG. 2 is a schematic illustration of a printing apparatus incorporating the inventive features of the invention.

As shown in FIG. 2, a printing machine incorporating the invention may utilize a charge retentive member in the form of a photoconductive belt 10 consisting of a photoconductive surface and an electrically conductive substrate and mounted for movement past a charging station A, an exposure station B, developer station C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

As can be seen by further reference to FIG. 2, initially successive portions of belt 10 pass through charging station A. At charging station A, a corona discharge device such as a scorotron, corotron or dicorotron indicated generally by the reference numeral 24, charges the belt 10 to a selectively high uniform positive or negative potential, $V_0$. Any suitable control, well known in the art, may be employed for controlling the corona discharge device 24.

Next, the charge portions of the photoreceptor surface are advanced through exposure station B. At exposure station B, the uniformly charged photoreceptor or charge retentive surface 10 is exposed to a laser based input and/or output scanning device 25 which causes the charge retentive surface to be discharged in accordance with the output from the scanning device. Preferably the scanning device is a three level laser Raster Output Scanner (ROS).

The photoreceptor, which is initially charged to a voltage $V_0$, undergoes dark decay to a level $V_{ddp(Vcad)}$ equal to about 900 volts. When exposed at the exposure station B it is discharged to $V_c$ ($V_{dad}$) equal to about 100 volts which is near zero or ground potential in the highlight (i.e. color other than black) color parts of the image. See FIG. 1a. The photoreceptor is also discharged to $V_w$ ($V_{white}$) equal to 500 volts imagewise in the background (white) image areas. After passing through the exposure station, the photoreceptor contains charged areas and discharged areas which corresponding to two images, the the former being at a higher voltage level than the background and the latter being at a lower voltage than the background.

At development station C, a development system, indicated generally by the reference numeral 30 advances developer materials into contact with the electrostatic latent images. The development system 30 comprises first and second developer apparatuses 32 and 34. The developer apparatus 32 comprises a housing containing a pair of magnetic brush rollers 35 and 36. The rollers advance developer material 40 into contact with the photoreceptor for developing the discharged-area images (i.e. those areas of the photoreceptor at voltage level $V_{dad}$). The developer material 40 by way of example contains negatively charged red toner. Electrical biasing is accomplished via power supply 41 electrically connected to developer apparatus 32. A DC bias of approximately 400 volts is applied to the rollers 35 and 36 via the power supply 41.

The developer apparatus 34 comprises a housing containing a pair of magnetic brush rolls 37 and 38. The rollers advance developer material 42 into contact with the photoreceptor for developing the charged-area images. The developer material 42 by way of example contains positively charged black toner for developing the charged-area images (i.e. those areas of the photoreceptor at voltage level $V_{cad}$). Appropriate electrical biasing is accomplished via power supply 43 electrically connected to developer apparatus 34. A suitable DC bias of approximately 600 volts is applied to the rollers 37 and 38 via the bias power supply 43.

A sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station D.

Because the composite image developed on the photoreceptor consists of both positive and negative toner, a positive pre-transfer corona discharge member 56 is provided to condition the toner for effective transfer to a substrate using negative corona discharge.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 66. In this manner, the toner powder image is permanently affixed to sheet 58. After fusing, a chute, now shown, guides the advancing sheet 58 to a catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining prior to the charging thereof for the successive imaging cycle.

Many printing technologies allow only two states for any point on the imaging surface (i.e. ink or no ink). One such technology has been discussed above relative to the prior art and also in the description of FIG. 2. In spite of the strictly binary nature of the technology, the appearance of gray levels is produced as disclosed herein, by employing a fine pattern of dots. The dots blend with the background and yield a 'gray' or colored appearance when seen from a distance. Computer generated images are shaded or colored in this manner. The image is divided into pixels, the smallest picture element over which there is control of color presence or absence, and a pattern is applied to the pixels. The pattern is applied within the boundaries of an elemental area delineated by appropriate coordinates on a substrate to make that area appear shaded or colored. For simplicity the pattern or area is usually a small block of pixels which is replicated as needed to cover the imaging surface. A particular pattern or area of pixels constitutes a combination of complementary ink patterns. A set of ink patterns is provided in computer memory for many shades ranging from black to white and from red to white. Those ranging from black to white comprise one set of patterns and those ranging from red to white comprise a complementary set of patterns.

This invention preferably relates to the creation of ink pattern designs for color printers which utilize registered two-color imaging such as tri-level electrostatic printing. In such imaging systems, for example tri-level imaging, each pixel has three possible states: color A, color B or the color of the image substrate which is usually white paper but can be any preferred color. Since all pixels have only one color, apparent shades, hues, etc. are made by juxtapositioning of single colored pixels. Thus, apparent or simulated color is effected by mixing all three states within an ink pattern block or area of the substrate. While the present invention will be specifically disclose in conjunction with tri-level imaging, it will be appreciated that it can be utilized in other printing technologies such as ink jet printing.

Two sets of ink patterns, set A, depicted by reference character 70 (FIG. 3) for color A and set B, depicted by reference character 72 (FIG. 3b) for color B, are electronically stored in computer memory. An apparent or simulated color image is produced by overlaying an ink pattern from set A with an ink pattern pattern from complementary set B. For notation, let m-tuple $A_j = (P_{1j}, P_{2j}, \ldots, P_{mj})$ represent the jth ink pattern for color set A. $P_{ij}$ = binary 1 if pixel i has color A in pattern j and is otherwise 0. Similarly, let $B_k = (Q_{1k}, Q_{2k}, \ldots, Q_{mk})$ be the kth ink pattern for color set B where $Q_{ik}$ = binary 1 if pixel i has color B and is 0 otherwise.

In order to prevent color overlap, it must be assured that no pixel is required to be both color A and color B. More precisely, if ink patterns $A_j$ an $B_k$ are being used at the same time, there is no i for which $P_{ij} = Q_{ik}$. This condition is assured by the following restrictions on ink pattern design and use.

Additive Restriction—Ink designs must accumulate (add) color. Informally, ink patterns get darker (more binary 1's add color) as the ink index increases. Furthermore, any pixel colored in ink $A_j$ is also colored in inks $A_{j+1}, A_{j+2}, \ldots$ More formally, $$A_{j+1} = A_j V C_j$$

where $C_j$ is some non-zero m-tuple.

As a result, if there are n ink patterns in color set A (labeled 0 to n−1), the $A_0$ has the least color and $A_{n-1}$ has the most color. As a practical matter, $A_0$ is usually no color (all binary 0s) and $A_{n-1}$ is usually full color (i.e. all binary 1s).

As illustrated in FIG. 3, the ink patterns in Set A are represented by four pixels (m=4) arranged in 2 by 2 squares.

In accordance with this additive restriction, once set a pixel cannot be reset in forming a subsequent ink pattern.

Thus, even though color has been added to the pattern depicted by reference chacter 74 in FIG. 3a, it could not be used as pattern 2 of FIG. 3 because the lower-left pixel (a binary 1) in pattern 1 (FIG. 3) would have to be reset to binary 0 which would be contrary to this restriction.

Order Restriction:

The inks for color b are complements of those in color Set A, but in reverse order. That is, $$B_k = \sim A_{n-1-k} \text{ for } k=0, 1, \ldots, n-1.$$

The notation $\sim A$ is the element-wise negation of $A_j$'s m-tuple.

The complements of the patterns in set A are depicted by reference character 76 in FIG. 3b.

The reverse order of these complements which defines color Set B is depicted by reference character 72 in FIG. 3c Combination Restriction:

Ink pattern $A_j$ and $B_k$ may be used at the same time without color overlap provided j (ink pattern number from set A)+k (ink pattern number from set B)<n (the number of patterns in one set). With this restrictions, ink patterns from color sets A and B result in a total number of n(n+1)/2.

An example of ink combinations for two sets (i.e. Set A and Set B) of 2 by 2 ink pattens can be represented as depicted by reference character 78 in FIG. 3d. According to the combination restriction, pattern 2 of color set A could not be combined with pattern 2 from color set b because j+k would equate to 4 which is not less than n which is equal to 4. Also, according to combination restriction, for the above example there are 10 ink possible patterns (i.e. n(n+1)/2 equates to 4(4+1)/2 which equals 10. Thus, ten patterns are derived from the eight basic ink patterns of sets A and B. A greater number of pattern combinations is possible when the number of patterns in each set is increased. For example, if set set A and set B each had 15 patterns the number of possible patterns is 120[i.e. n(n+1)/2=15*16/2=120]

In accordance with the invention, each pattern of Set A and Set B is stored in memory in a digital computer 80, FIG. 2. Also stored in memory is a two-color image. A program stored in computer memory effects retrieval of two ink patterns from memory, one from Set A and one from Set B which satisfy the specific color of an elemental area of the two-color image. A bit stream passed to the electronic subsystem (ESS) 82 from the computer 80 is processed thereby to generate the corresponding control signals for high, medium or low laser levels transmitted to a controller 84. The controller is operatively connected to the ROS 25 for generating high, medium or low laser levels for forming a tri-level latent image on the the photoreceptor. The image is then developed in the manner described above

What is claimed is:

1. The method of gray scale imaging, said method including the steps of:
   combining complementary ink patterns on an imaging surface thereby forming a representation of an elemental area of an original image; and
   repeating said step of combining complementary ink patterns for each elemental area of said original image.

2. The method according to claim 1 including the step of utilizing ink patterns from two sets of ink patterns, each set comprising a plurality of individual ink patterns, one ink pattern from each set being combined to form said representation.

3. The method according to claim 2 including the step of providing electronically stored sets of complementary ink patterns for said step of combining complementary ink patterns.

4. The method according to claim 3 including the step of utilizing said electronically stored sets of complementary ink patterns to form a tri-level image on a charge retentive surface.

5. The method according to claim 4 including the step of developing said tri-level image using two different colored toners 6. The method according to claim 2 wherein the first pattern in each set of ink patterns is void of color and each successive pattern is created by the addition of color to a preceding pattern and wherein each set of ink patterns is the complement of each other but in reverse order and further wherein the sum of the positions of two ink patterns, one from each set, is less than the total number of patterns in a set.

7. The method according to claim 3 wherein the first pattern in each set of ink patterns is void of color and each successive pattern is created by the addition of color to a preceding pattern and wherein each set of ink patterns is the complement of each other but in reverse order and further wherein the sum of the positions of two ink patterns, one from each set, is less than the total number of patterns in a set.

8. The method according to claim 4 wherein the first pattern in each set of ink patterns is void of color and each successive pattern is created by the addition of color to a preceding pattern and wherein each set of ink patterns is the complement of each other but in reverse order and further wherein the sum of the positions of two ink patterns, one from each set, is less than the total number of patterns in a set.

9. The method according to claim 5 wherein the first pattern in each set of ink patterns is void of color and each successive pattern is created by the addition of color to a preceding pattern and wherein each set of ink patterns is the complement of each other but in reverse order and further wherein the sum of the positions of two ink patterns, one from each set, is less than the total number of patterns in a set.

* * * * *